United States Patent
Liu et al.

(10) Patent No.: US 11,343,113 B2
(45) Date of Patent: May 24, 2022

(54) CREATION OF ENTERPRISE GROUP

(71) Applicant: BEIJING SANKUAI ONLINE TECHNOLOGY CO., LTD., Beijing (CN)

(72) Inventors: Pingchuan Liu, Beijing (CN); Xinfeng Mi, Beijing (CN); Xu Zhang, Beijing (CN); Huiyuan Cao, Beijing (CN)

(73) Assignee: BEIJING SANKUAI ONLINE TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 16/713,662

(22) Filed: Dec. 13, 2019

(65) Prior Publication Data

US 2020/0195459 A1    Jun. 18, 2020

Related U.S. Application Data

(63) Continuation of application No. PCT/CN2017/116987, filed on Dec. 18, 2017.

(30) Foreign Application Priority Data

Jun. 22, 2017  (CN) .......................... 201710485010.2

(51) Int. Cl.
*H04L 12/18*    (2006.01)
*H04L 51/04*    (2022.01)

(52) U.S. Cl.
CPC ........ *H04L 12/1822* (2013.01); *H04L 12/185* (2013.01); *H04L 51/04* (2013.01)

(58) Field of Classification Search
CPC .... H04L 12/1822; H04L 12/185; H04L 51/04
See application file for complete search history.

(56) References Cited

U.S. PATENT DOCUMENTS 8,245,141 B1 *  8/2012  Fuller ................ H04L 12/1822
                                              715/741
8,316,128 B2 * 11/2012  Beck .................. H04L 12/1822
                                              709/226
(Continued)

FOREIGN PATENT DOCUMENTS

CN         1878073 A      12/2006
CN       100553198 C      10/2009
(Continued)

OTHER PUBLICATIONS

International Search Report dated Feb. 26, 2018, of corresponding PCT/CN2017/116987 in English.
(Continued)

*Primary Examiner* — Patrice L Winder
(74) *Attorney, Agent, or Firm* — Nath, Goldberg & Meyer; Joshua B. Goldberg

(57) ABSTRACT

The present invention provides a method for establishing an enterprise group and a corresponding apparatus. According to an example, an IM application server may determine, according to a received join-group request for adding a first user to an inside group, whether identity information of the first user matches attribute information of the inside group. If the identity information of the first user matches the attribute information of the inside group, the server may add the first user to the inside group, and send a first notification message to a client corresponding to the first user. If the identity information of the first user does not match the attribute information of the inside group, the server may create an inter-enterprise group including the first user and all members of the inside group, and send a second notification message to the client corresponding to the first user.

19 Claims, 8 Drawing Sheets

(56) References Cited

U.S. PATENT DOCUMENTS

| | | | |
|---|---|---|---|
| 9,973,552 B2* | 5/2018 | Lappin | H04L 51/32 |
| 10,171,400 B2* | 1/2019 | Bagby | H04L 51/18 |
| 10,225,214 B2* | 3/2019 | Yoo | H04L 12/1827 |
| 10,812,539 B2* | 10/2020 | Chen | H04L 12/1822 |
| 2006/0045029 A1 | 3/2006 | Ethier et al. | |
| 2008/0307040 A1 | 12/2008 | So | |
| 2009/0099895 A1* | 4/2009 | Carrier | G06Q 50/01 |
| | | | 705/75 |
| 2018/0302353 A1* | 10/2018 | Ma | H04L 51/04 |
| 2019/0190863 A1* | 6/2019 | Baker | H04L 63/104 |
| 2020/0259779 A1* | 8/2020 | Liu | H04L 51/10 |

FOREIGN PATENT DOCUMENTS

| | | | |
|---|---|---|---|
| CN | 105099876 A | 11/2015 | |
| CN | 105610681 A | 5/2016 | |
| CN | 105897704 A | 8/2016 | |
| CN | 107276775 A | 10/2017 | |
| WO | 2016149338 A1 | 9/2016 | |
| WO | 2017067419 A1 | 4/2017 | |

OTHER PUBLICATIONS

First Office Action Search Report prepared Aug. 31, 2018 for corresponding CN 201710485010.2.
Extended European search report conducted on Dec. 10, 2020 for application No. EP 17 91 4610.

* cited by examiner

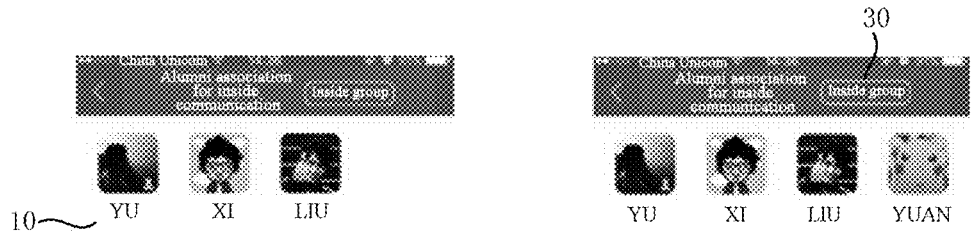
FIG. 3-2
FIG. 3-3
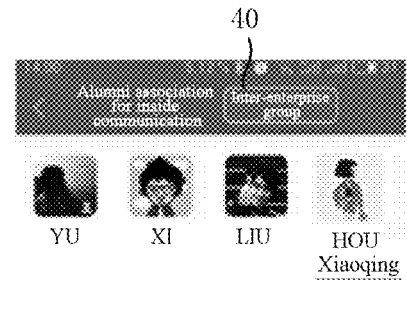
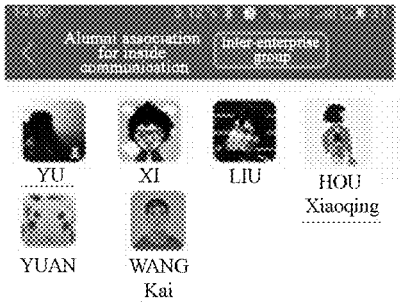
FIG. 3-4
FIG. 3-5

CREATION OF ENTERPRISE GROUP

CROSS-REFERENCE TO RELATED APPLICATIONS

This application claims priority to Chinese Patent Application No. 201710485010.2, filed on Jun. 22, 2017 and entitled "METHOD AND APPARATUS FOR ESTABLISHING ENTERPRISE GROUP", which is incorporated herein by reference in its entirety.

BACKGROUND

Technical Field

Embodiments of the present invention relate to establishment of an enterprise group in an instant messaging (IM) application.

Related Art

An enterprise instant messaging (EIM) is an online communication tool service for users of enterprise terminals. For enterprise employees, two or more people may communicate in real time by using terminals installed with IM. An EIM service may be used to establish an intra-enterprise group for communication of employees of the same enterprise or an inter-enterprise group for communication of employees of different enterprises.

When an inside group of an enterprise needs to include employees of other enterprises, a new group may be established, and all the employees that need to be added are added to the new group. However, when a large number of employees of other enterprises need to be added to an inside group of the enterprise, groups need to be established over and over again, resulting in a complex procedure.

SUMMARY

The present invention provides a method for establishing an enterprise group and a corresponding apparatus, to simplify operations of adding a large number of employees of outside enterprises.

According to a first aspect of the present invention, a method for establishing an enterprise group on a server side is provided and includes: receiving, by a server, a first join-group request for adding a first user to an inside group, where the first join-group request includes identity information of the first user; and if the identity information of the first user does not match attribute information of the inside group, creating, by the server, an inter-enterprise group according to identity information of at least one member of the inside group and the identity information of the first user.

According to a second aspect of the present invention, a method for establishing an enterprise group on a client side is provided and includes: receiving, by a client, a first join-group instruction for adding a first user to an inside group; generating, by the client, a first join-group request including identity information of the first user according to the first join-group instruction; and sending, by the client, the first join-group request to a server, so that if the identity information of the first user does not match attribute information of the inside group, the server creates an inter-enterprise group for the first user and at least one member of the inside group.

According to a fifth aspect of the present invention, an IM application server is provided and includes: one or more processors; and one or more machine readable media storing instructions. When the one or more processors execute the instructions in the machine readable medium, the processor performs the method for establishing an enterprise group on a server side.

According to a sixth aspect of the present invention, a non-volatile readable storage medium is provided, where when instructions in the non-volatile storage medium are executed by a processor in an IM application server, the processor can perform the method for establishing an enterprise group on a server side.

According to a seventh aspect of the present invention, an IM application client is provided and includes: one or more processors; and one or more machine readable media storing instructions. When the one or more processors execute the instructions in the machine readable medium, the processor performs the method for establishing an enterprise group on a client side.

According to an eighth aspect of the present invention, a non-volatile readable storage medium is provided, where when instructions in the non-volatile storage medium are executed by a processor in an IM application client, the processor can perform the method for establishing an enterprise group on a client side.

It is determined, according to a join-group request from a first user, whether identity information of the first user matches attribute information of a current inside group. If the identity information of the first user matches the attribute information of the current inside group, the first user is added to the inside group. If the identity information of the first user does not match the attribute information of the current inside group, an inter-enterprise group including the first user and all users in the inside group is created. By means of the method for establishing an enterprise group according to the embodiments of the present invention, an identity of an added user can be automatically identified and an inter-enterprise group can be automatically created, thereby effectively simplifying operations of adding a large number of employees of outside enterprises.

BRIEF DESCRIPTION OF THE DRAWINGS

To describe the technical solutions of the embodiments of the present invention more clearly, the following briefly introduces the accompanying drawings required for describing the embodiments of the present invention. Apparently, the accompanying drawings in the following description show only some embodiments of the present invention, and a person of ordinary skill in the art may still derive other drawings from these accompanying drawings without creative efforts.

FIG. 2-1 is a flowchart of steps of a method for establishing an enterprise group on a server side according to another embodiment of the present invention.

FIG. 2-2A and FIG. 2-2B are application interface views of a method for establishing an enterprise group according to another embodiment of the present invention.

FIG. 3-1 is a flowchart of steps of a method for establishing an enterprise group on a server side according to an embodiment of the present invention.

FIG. 3-2 is an application interface view of a method for establishing an enterprise group according to an embodiment of the present invention.

FIG. 3-3 is an application interface view of a method for establishing an enterprise group according to an embodiment of the present invention.

FIG. 3-4 is an application interface view of a method for establishing an enterprise group according to an embodiment of the present invention.

FIG. 3-5 is an application interface view of a method for establishing an enterprise group according to an embodiment of the present invention.

FIG. 4 is a flowchart of steps of a method for establishing an enterprise group on a client side according to an embodiment of the present invention.

FIG. 5 is a flowchart of steps of a method for establishing an enterprise group on a client side according to an embodiment of the present invention.

DETAILED DESCRIPTION

The following clearly and completely describes the technical solutions in the embodiments of the present invention with reference to the accompanying drawings in the embodiments of the present invention. The described embodiments are some of the embodiments of the present invention rather than all of the embodiments. All other embodiments obtained by a person of ordinary skill in the art based on the embodiments of the present invention without creative efforts shall fall within the protection scope of the present disclosure.

A method for establishing an enterprise group provided in an embodiment of the present invention is based on an EIM technology. EMI is an online communication tool service for users of enterprise terminals. For the users, two or more people may communicate in real time by using terminals installed with IM. The content of communication may include exchanged text, interfaces, speech, videos, files, and the like.

Different from a personal IM tool, an EIM tool requires that a user should provide genuine identity information for the purpose of work-related communication, nearly all data documents transmitted in the system are related to services or even secrets of an enterprise. Therefore, a top priority of an EIM system is to safeguard privacy and company business information. Therefore, such a system is usually deployed on a server possessed by an enterprise, and employees may log in to the server to perform work-related communication within a particular range.

In a network architecture of an EIM tool, an enterprise may set one general server and set several corresponding databases according to the division of an inside sub-server and an outside sub-server. An IM system is deployed for each sub-server. An IM client installed by an employee may log in to the sub-servers to perform work-related communication within the range of the inside sub-server or the outside sub-server. However, IM systems of the inside sub-server and the outside sub-server require authorization before instant communication. For example, a general database may store the name of an inside/trusted company, an organization code, a business scope, an address, a rank, an affiliation relationship, and the like. Each database covers the information of all employees of an enterprise. Each piece of employee information may include, for example, a division, a post, a name, a phone number, an email address, a position type, and a service type.

Figure 1:
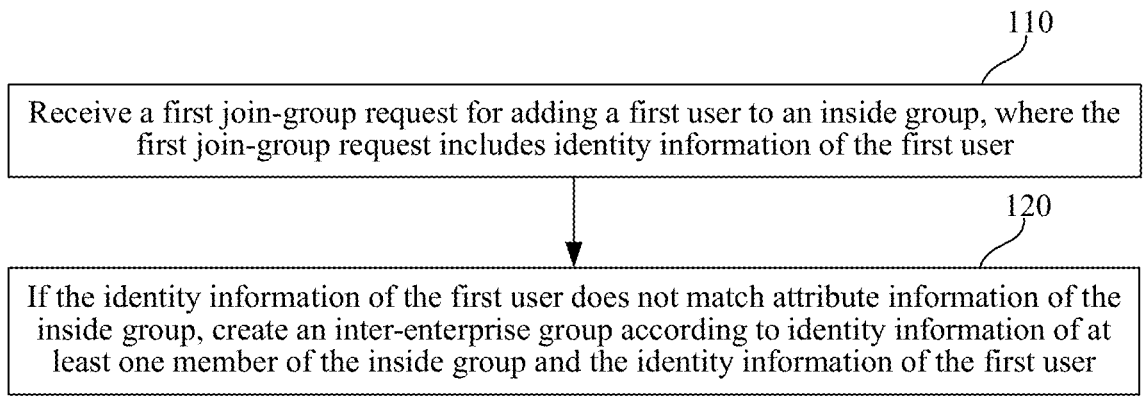
FIG. 1 is a flowchart of steps of a method for establishing an enterprise group on a server side according to an embodiment of the present invention.

FIG. 1 is a flowchart of steps of a method for establishing an enterprise group on a server side. The method may specifically include the following steps.

Step 110: Receive a first join-group request for adding a first user to an inside group, where the first join-group request includes identity information of the first user.

Step 120: If the identity information of the first user does not match attribute information of the inside group, create an inter-enterprise group according to identity information of at least one member of the inside group and the identity information of the first user.

A server may determine whether the identity information of the first user matches the attribute information of the inside group. If the identity information of the first user matches the attribute information of the inside group, the first user is added to the inside group. If the identity information of the first user does not match the attribute information of the inside group, the identity information of the at least one member of the inside group and the identity information of the first user are retrieved, and the inter-enterprise group is created according to the retrieved identity information.

In EIM, an inside group of an enterprise is established to ensure security. The inside group of the enterprise is somewhat closed, for example, only supports communication of employees of a current enterprise. However, during working, an employee of the current enterprise often needs to collaborate with an employee (which may be referred to as an employee of an outside enterprise for short below) of another enterprise such as a trusted enterprise (an enterprise that reaches a mutual trust agreement with the current company). An inter-enterprise group may be created, and permissions may be set for an employee of an outside enterprise in the inter-enterprise group.

When a join-group request for adding the first user to the inside group is received, the identity information of the first user is determined. When the first user is an employee of an outside enterprise, identity data of the first user is retrieved, and an inter-enterprise group is created according to the retrieved identity data. In this way, an employee of the current enterprise and an employee of an outside enterprise can communicate with each other, and an employee of an outside enterprise can be prevented from accessing private data of the current enterprise in the inside group. Moreover, when a large number of employees of outside enterprises need to be added, it is not necessary to establish groups over and over again.

It is determined, according to a join-group request for adding a first user to an inside group, whether identity information of the first user matches attribute information of a current inside group. If the identity information of the first user matches the attribute information of the current inside group, the first user is added to the inside group. If the identity information of the first user does not match the attribute information of the current inside group, an inter-enterprise group including the first user and all users in the inside group is created. By means of the method for establishing an enterprise group on a server side, an identity of an added user can be automatically identified and an inter-enterprise group can be automatically created, thereby effectively simplifying operations of adding a large number of employees of outside enterprises.

Figures 1, 2:
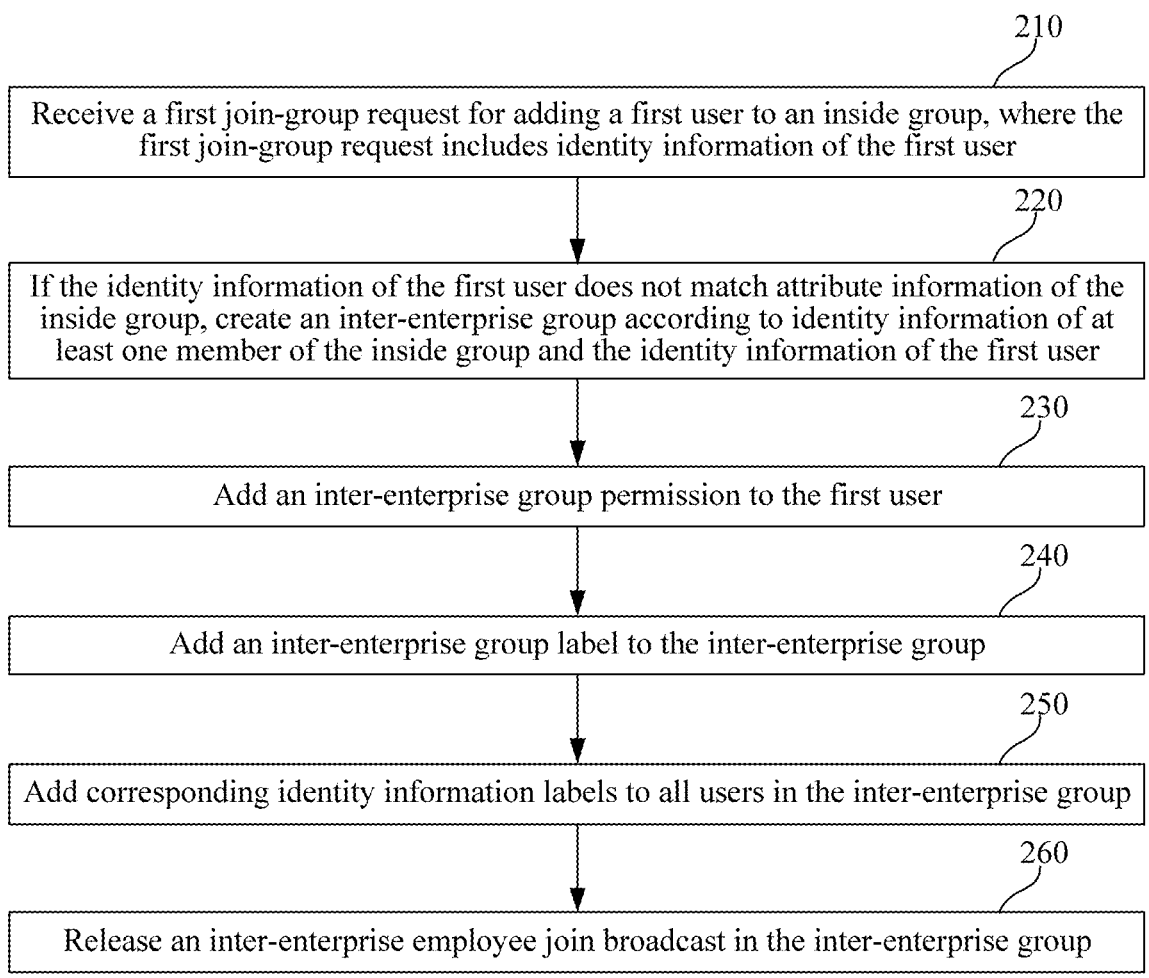

FIG. 2-1 is a flowchart of steps of a method for establishing an enterprise group on a server side. The method may include the following steps.

Step 210: Receive a first join-group request for adding a first user to an inside group, where the first join-group request includes identity information of the first user.

The first join-group request may include the identity information of the first user, for example, an enterprise, a division, a post, a name, a phone number, an email address, a position type, and a service type of the first user. When a server receives a join-group request, the identity information of the first user included in the request may be parsed from the join-group request.

It should be noted that the first join-group request may be a join-group request sent by a terminal of the first user for the inside group, or may be a join-group recommendation request sent by a terminal of a member of the inside group for the first user.

Step 220: If the identity information of the first user does not match attribute information of the inside group, create an inter-enterprise group according to identity information of at least one member of the inside group and the identity information of the first user.

The server may compare the received identity information of the first user with information of a member of the inside group, to determine whether the first user is an employee of the current enterprise that has permissions for the inside group.

For example, when receiving a request sent by a client of a new user to request to join the inside group, an EIM application automatically performs determination according to the request and feeds back a processing result to the client of the new user and a client of an administrator. If the new user is an employee of the current enterprise, the processing result is admission. If the new user is an employee of an outside enterprise, the processing result is admission, and an inter-enterprise group is created. If an employee A of an outside enterprise needs to join the inside group of the current enterprise to collaborate on a project, the employee A of the outside enterprise may use the EIM application to find the inside group and submit a join-group request. In this case, the server may create an inter-enterprise group according to identity information of the employee A of the outside enterprise, and add the employee A of the outside enterprise to the inter-enterprise group. In this case, the administrator of the inside group receives detailed information of the current addition.

If the identity information of the first user matches the attribute information of the inside group, the first user may be added to the inside group, and the first user and another member of the inside group have the same group permissions, including the permission to access historical data in the inside group.

If the identity information of the first user does not match attribute information of the inside group, it is determined that currently the first user is an employee of an outside enterprise. In this case, all data of the inside group and the identity information of the first user are retrieved, and a new, separate inter-enterprise group is created according to the retrieved data. For example, the inter-enterprise group may store all previous data of the inside group to facilitate the collaborative communication between employees of the current enterprise and other employees of outside enterprises. It should be noted that, after the inter-enterprise group is created, the original inside group is kept instead of being deleted, so that the employee of the current enterprise may use the inside group for inside communication.

Step 230: Add an inter-enterprise group permission to the first user.

The inter-enterprise group permission is used to prohibit the first user from accessing data of the inside group stored in the inter-enterprise group. To be specific, the newly added first user does not have the permission to access the data of the inside group stored in the inter-enterprise group. For example, after the inter-enterprise group is created, an employee of an outside enterprise in the group cannot access historical chat records, files, and the like of the inside group that are stored in the group, and cannot use some group functions such as adding a member, removing a member, and creating a video conference.

Step 240: Add an inter-enterprise group label to the inter-enterprise group.

Figures 2, 2A:
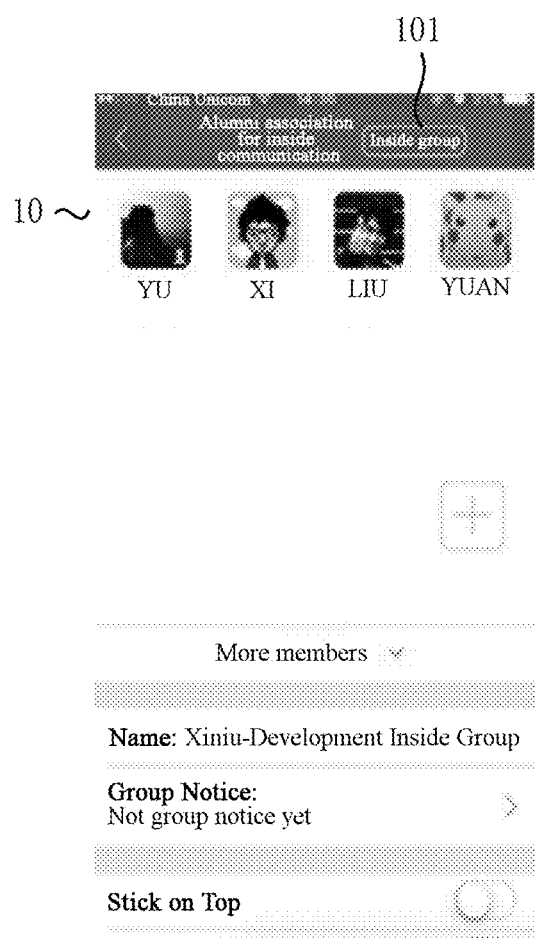
Figures 2, 2B:
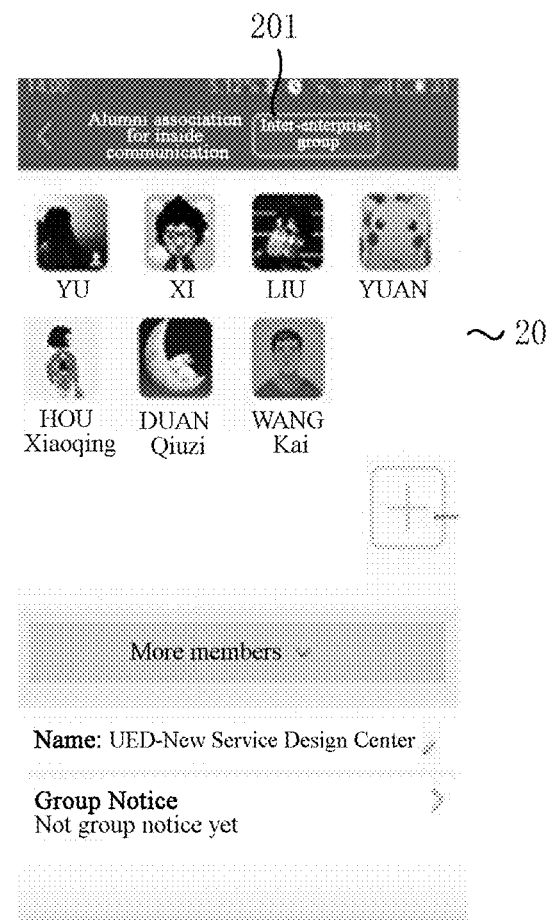

As shown in FIG. 2-2A and FIG. 2-2B, each group established by the EIM application corresponds to one group label, for example, an inside group, an inter-enterprise group, and a high management group. Only the administrator can change or delete the group label. After the inter-enterprise group is created, the server may automatically change an inside group label 101 of an inside group on an original interface 10 shown in FIG. 2-2A to an inter-enterprise group label 201 on an interface 20 shown in FIG. 2-2B, to remind members of the inside group that employees of outside enterprises have joined the current group, thereby preventing an employee of a current enterprise from leaking company data unwittingly.

Step 250: Add corresponding identity information labels to all users in the inter-enterprise group.

After the inter-enterprise group is created, corresponding identity information labels are added to members of the inter-enterprise group. The identity information label is, for example, an enterprise, a division, a post, a name, a phone number, an email address, a position type, and a service type. An enterprise to which a member belongs is preferentially displayed, so that the members of the inter-enterprise group are distinguished.

Step 260: Release an inter-enterprise employee join broadcast in the inter-enterprise group.

After the inter-enterprise group is created, the system releases notice information on a group noticeboard or a chat interface. The notice information is, for example, "XXX from an outside enterprise has joined the group. The group is now upgraded to an inter-enterprise group." used to remind members of the inside group that an employee of an outside enterprise has joined the current group, thereby preventing an employee of a current enterprise from leaking company data unwittingly.

It should be noted that, the sequence of step 230 to step 260 may be appropriately adjusted or a step may be correspondingly added or removed as required. Any method variant that can be easily derived by those skilled in the art should fall within the protection scope of the present invention. Therefore, details are not described again.

An inter-enterprise group label is added to an inter-enterprise group, an outside-enterprise employee join broadcast is released, and corresponding identity information labels are added to all users in the inter-enterprise group. By means of the method for establishing an enterprise group on a server side, an employee of a current enterprise can be effectively prevented from leaking company data unwittingly.

Figures 1, 3:
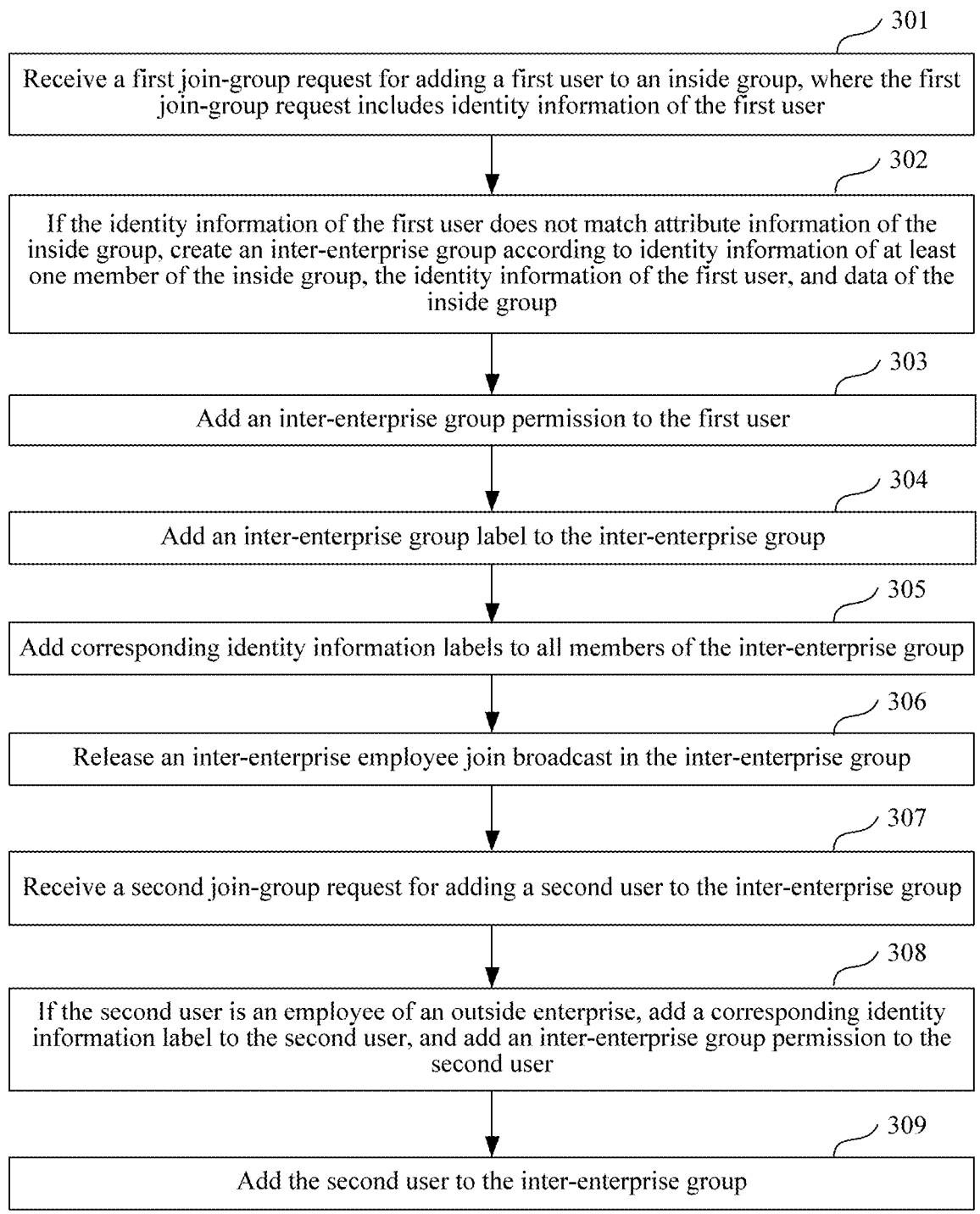

FIG. 3-1 is a flowchart of steps of a method for establishing an enterprise group on a server side. The method may include the following steps.

Step 301: Receive a first join-group request for adding a first user to an inside group, where the first join-group request includes identity information of the first user.

Step 302: If the identity information of the first user does not match attribute information of the inside group, create an inter-enterprise group according to identity information of at least one member of the inside group, the identity information of the first user, and data of the inside group.

Step 303: Add an inter-enterprise group permission to the first user.

Step 304: Add an inter-enterprise group label to the inter-enterprise group.

Step 305: Add a corresponding identity information label to at least one user in the inter-enterprise group.

Step 306: Release an inter-enterprise employee join broadcast in the inter-enterprise group.

For step 301 to step 306, refer to step 210 to step 260. Details are not described herein again.

Step 307: Receive a second join-group request for adding a second user to the inter-enterprise group.

After the inter-enterprise group is established, a join-group request sent by a terminal of the second user for the inter-enterprise group may be received. It should be noted that the second join-group request may be a join-group request sent by the terminal of the second user for the inter-enterprise group, or may be a join-group recommendation request sent by a terminal of a member of the inter-enterprise group for the second user.

Step 308: If it is determined that the second user is an employee of an outside enterprise, add a corresponding identity information label to the second user, and add an inter-enterprise group permission to the second user. The inter-enterprise group permission is used to prohibit the second user from accessing the data of the inside group stored in the inter-enterprise group.

If the second user is neither an employee of a trusted enterprise nor an employee of the current enterprise, it may be concluded that the second user is a potentially malicious person that has entered by exploiting a loophole, and a join-group request of the second user is rejected to safeguard the inter-enterprise group more adequately.

Step 309: Add the second user to the inter-enterprise group.

When the second user is either an employee of the current enterprise or an employee of an outside enterprise, the second user may be added to the inter-enterprise group.

If the first user and the second user have left the inter-enterprise group, the identity information of the first user and identity information of the second user in the inter-enterprise group may be deleted.

If all employees of outside enterprises in one the inter-enterprise group have left the group, it may be determined that the current collaborative communication has ended, and the inter-enterprise group label may be changed back to the inside group label, so that users of the current enterprise can continue to use the inside group to perform inside communication.

It should be noted that, the sequence of step 303 to step 306 may be appropriately adjusted or a step may be correspondingly added or removed as required. Any method variant that can be easily derived by those skilled in the art should fall within the protection scope of the present invention. Therefore, details are not described again.

Figure 4:
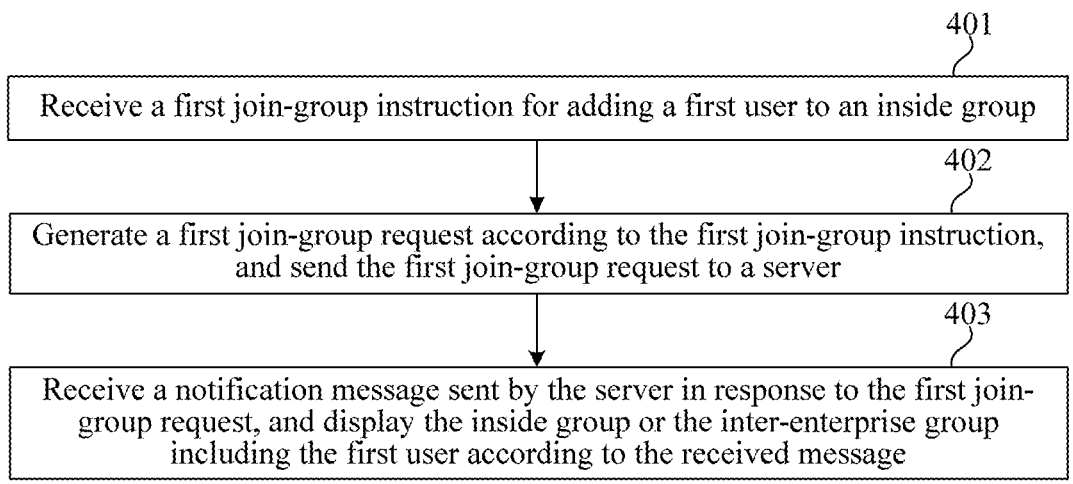

For example, as shown in FIG. 3-2, it is assumed that an enterprise A uses an EIM application to establish an inside group 10 named "Alumni association for inside communication". There are employees of the enterprise A whose names are YU, XI, and LIU in the inside group. An enterprise B needs to collaborate with the company A on a project, and dispatches collaborators named HOU Xiaoqing and WANG Kai. According to step 301, an IM application server of the enterprise A receives a join-group request. The join-group request may be sent by YUAN from the enterprise A or may be sent by HOU Xiaoqing and WANG Kai from the trusted enterprise B. In this case, the server may invoke enterprise member identity information in a database to determine identity information of a member corresponding to the join-group request. If it is determined that the member corresponding to the join-group request is YUAN from the current enterprise A, as shown in FIG. 3-3, YUAN may be directly added to the inside group, and an inside group label 30 is kept unchanged. If it is determined, according to step 302, as shown in FIG. 3-4, that the member corresponding to the join-group request is HOU Xiaoqing from the trusted enterprise B, an inter-enterprise group including YU, XI, LIU, and HOU Xiaoqing is created. Next, according to step 303 to step 306, the inside group label 30 shown in FIG. 3-3 is changed to an inter-enterprise group label 40 shown in FIG. 3-4, an inter-enterprise group permission is added to HOU Xiaoqing, and corresponding identity information labels are added to all members of the inter-enterprise group. The identity information label is, for example, an enterprise, a division, a post, a name, a phone number, an email address, a position type, and a service type of a member. Finally, an inter-enterprise employee join broadcast concerning HOU Xiaoqing may be released on the group noticeboard.

Figure 5:
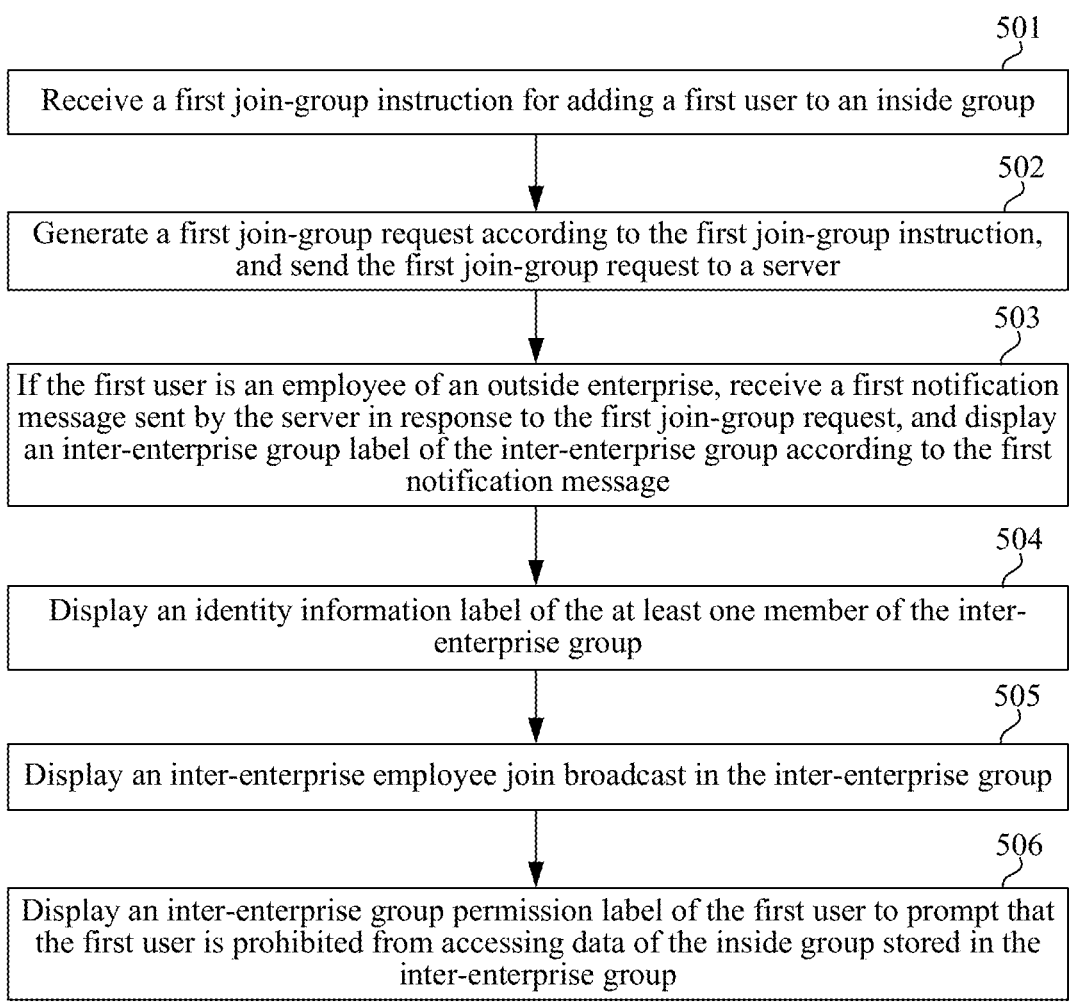

After the inter-enterprise group including YU, XI, LIU, and HOU Xiaoqing shown in FIG. 3-4 is established, according to step 307, if the server continues to receive a join-group request, it may be determined that the member corresponding to the join-group request is YUAN from the current enterprise A or WANG Kai from the trusted enterprise B, as shown in FIG. 3-5. If according to step 309, it is determined that the member corresponding to the join-group request is WANG Kai from the trusted enterprise B, WANG Kai is added to the inter-enterprise group, and step 308 is performed to add a corresponding identity information label and an inter-enterprise group permission to WANG Kai and release a join broadcast. If the member corresponding to the join-group request is YUAN from the current enterprise A, YUAN is directly added to the inter-enterprise group. If the member corresponding to the join-group request is neither an employee from the trusted enterprise B nor an employee from the current enterprise, the member may be rejected from joining the inter-enterprise group. After the collaboration on a project has ended and both the employees HOU Xiaoqing and WANG Kai of the trusted enterprise in the inter-enterprise group have left the group, identity information of HOU Xiaoqing and identity information of WANG Kai may be deleted from the group, and an inter-enterprise group label is changed to an inside group label. A specific interface may be shown in FIG. 3-3.

FIG. 4 is a flowchart of steps of a method for establishing an enterprise group on a client side. The method may include the following steps.

Step 401: Receive a first join-group instruction for adding a first user to an inside group.

The first join-group instruction may be a join-group instruction from a terminal of the first user for the inside group, or may be a join-group recommendation instruction from a terminal of a member of the inside group for the first user.

Step 402: Generate a first join-group request according to the first join-group instruction, and send the first join-group request to a server. In this way, if identity information of the first user does not match attribute information of the inside group, it may represent that the first user is not an employee of an enterprise corresponding to the inside group, the server may create an inter-enterprise group for the first user and at least one member of the inside group.

After a client receives the first join-group instruction, if the first user is an employee of an outside enterprise, the inter-enterprise group is created. Moreover, the first user and the at least one member of the original inside group are displayed in the inter-enterprise group. Certainly, during actual application, the first user and all members of the original inside group may be displayed.

After the first join-group instruction is received, the client may generate the first join-group request including the identity information of the first user according to the first join-group instruction. For example, the client may retrieve the identity information of the first user according to the received first join-group instruction, generate the first join-group request according to the retrieved identity information, and send the first join-group request to the server.

The first join-group request is used by the server to determine whether the identity information of the first user matches the attribute information of the inside group. If the identity information of the first user matches the attribute information of the inside group, the server may add the first user to the inside group, and return a first notification message to the client, to notify the client that the first user has joined the inside group. If the identity information of the first user does not match the attribute information of the inside group, the server may create the inter-enterprise group according to identity information of the at least one member of the inside group and the identity information of the first user, and return a second notification message to the client, to notify the client that the first user has joined the inter-enterprise group. For a specific execution process of the server side, refer to the foregoing. Details are not described herein again.

Step 403: Receive a notification message sent by the server in response to the first join-group request, and display the inside group or the inter-enterprise group including the first user according to the received message.

If the first notification message sent by the server is received, the client may display the inside group including the first user. For example, the client may display the inside group including the first user on a group menu of an EIM application of the client according to the first notification message, including adding an icon, a name or the like of the first user to a user list interface of the EIM application.

If the second notification message sent by the server is received, the client may display a newly created inter-enterprise group including the first user. For example, the client may display the newly created inter-enterprise group on a group menu of an EIM application of the client according to the second notification message. The inter-enterprise group may store all previous data of the inside group, and display a distinguishing label for the inter-enterprise group, to satisfy collaborative communication between employees of the current enterprise and employees of outside enterprises.

The client may further receive a second join-group instruction. The second join-group instruction is used to add a second user to the inter-enterprise group. It should be noted that, the second join-group instruction may be a join-group instruction sent by a terminal of the second user for the inter-enterprise group, or may be a join-group recommendation instruction sent by a terminal of a member of the inter-enterprise group for the second user.

The client may generate a second join-group request including identity information of the second user according to the second join-group instruction. For example, the client may retrieve the identity information of the second user according to the received second join-group instruction, generate the second join-group request according to the retrieved identity information, and send the second join-group request to the server.

In this case, if determining that the second user is neither an employee of a trusted enterprise nor an employee of the current enterprise, the server may reject the second user from joining the inter-enterprise group. If determining that the second user is an employee of a trusted enterprise instead of an employee of the current enterprise, the server may add the second user to the inter-enterprise group, and send a third notification message to the client, to notify the client that the second user has joined the inter-enterprise group.

The client may display the second user in the inter-enterprise group according to the third notification message, and display an identity information label of the second user and an inter-enterprise group permission label of the second user, to prompt that the second user is prohibited from accessing data of the inside group stored in the inter-enterprise group.

A first join-group request including identity information of a first user is generated according to a first join-group instruction for adding the first user to the inside group, and the first join-group request is sent to a server, so that the server can automatically identify an identity of an added user and automatically create an inter-enterprise group, thereby effectively simplifying operations of adding a large number of employees of outside enterprises.

FIG. 5 is a flowchart of steps of a method for establishing an enterprise group on a client side. The method may specifically include the following steps:

Step 501: Receive a first join-group instruction for adding a first user to an inside group.

Step 502: Generate a first join-group request according to the first join-group instruction, and send the first join-group request to a server. In this way, if the first user is an employee of an outside enterprise, the server may create an inter-enterprise group for the first user and at least one member of the inside group as discussed above.

For step 501 to step 502, refer to the description of step 401 and step 402. Details are not described herein again.

Step 503: If the first user is an employee of an outside enterprise, receive a first notification message sent by the server in response to the first join-group request, and display an inter-enterprise group label of the inter-enterprise group according to the first notification message.

Referring to FIG. 2-2B, the inter-enterprise group label may be a sub-label 201 on an EIM application interface 20 of a client. The sub-label 201 is used to remind members of the inside group that an employee of an outside enterprise has joined the current group, thereby preventing an employee of a current enterprise from leaking company data unwittingly.

Step 504: Display an identity information label of the at least one member of the inter-enterprise group.

After the inter-enterprise group is created, the server may add an identity information label to each member of the inter-enterprise group. The identity information label is, for example, an enterprise, a division, a post, a name, a phone number, an email address, a position type, and a service type. Correspondingly, the client may display an identity information label of each member of the inter-enterprise group on a local EIM application interface. For example, an enterprise to which a member belongs may be preferentially displayed, so that the members of the inter-enterprise group are distinguished. According to an example, on an application interface of the client, the foregoing information is displayed when an icon of a user on the interface is touched.

Step 505: Display an inter-enterprise employee join broadcast in the inter-enterprise group.

After the inter-enterprise group is created, the server releases notice information on a group noticeboard or a chat interface. The notice information is, for example, "XXX from an outside enterprise has joined the group. The group is now upgraded to an inter-enterprise group.", to remind members of the inside group that an employee of an outside enterprise has joined the current group, thereby preventing an employee of a current enterprise from leaking company data unwittingly. Correspondingly, the client may display the inter-enterprise employee join broadcast on the local EIM application interface.

Step 506: Display an inter-enterprise group permission label of the first user. The inter-enterprise group permission label is used to prompt that the first user is prohibited from accessing data of the inside group stored in the inter-enterprise group.

It should be noted that, the sequence of step 503 to step 506 may be appropriately adjusted or a step may be correspondingly added or removed as required. Any method variant that can be easily derived by those skilled in the art should fall within the protection scope of the present invention. Therefore, details are not described again.

An inter-enterprise group label is displayed, an inter-enterprise employee join broadcast released by a server is displayed, and identity information labels of all members of an inter-enterprise group are displayed, so that an employee of a current enterprise can be prevented from leaking company data unwittingly.

Figure 6:
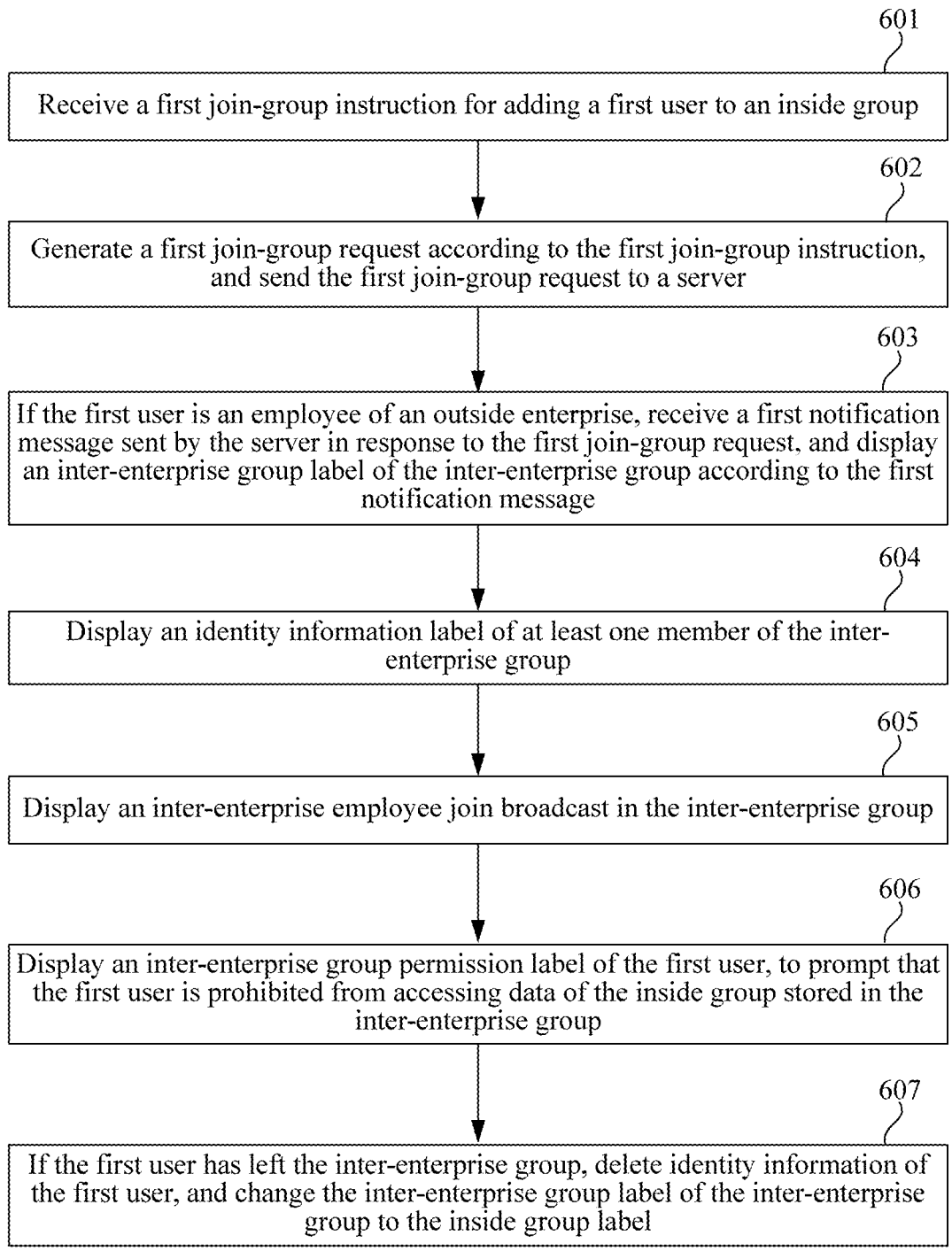
FIG. 6 is a flowchart of steps of a method for establishing an enterprise group on a client side according to an embodiment of the present invention.

FIG. 6 is a flowchart of steps of a method for establishing an enterprise group on a client side. The method may specifically include the following steps.

Step 601: Receive a first join-group instruction for adding a first user to an inside group.

Step 602: Generate a first join-group request according to the first join-group instruction, and send the first join-group request to a server. In this way, if the first user is an employee of an outside enterprise, the server may create an inter-enterprise group for the first user and at least one user in the inside group as discussed above.

Step 603: If the first user is an employee of an outside enterprise, receive a first notification message sent by the server in response to the first join-group request, and display an inter-enterprise group label of the inter-enterprise group according to the first notification message.

Step 604: Display an identity information label of at least one member of the inter-enterprise group.

Step 605: Display an inter-enterprise employee join broadcast in the inter-enterprise group.

Step 606: Display an inter-enterprise group permission label of the first user. The inter-enterprise group permission label is used to prompt that the first user is prohibited from accessing data of the inside group stored in the inter-enterprise group.

It should be noted that, for step 601 to step 606, refer to the description of step 501 to step 506. Details are not described herein again.

In addition, a client may further receive a second join-group instruction. The second join-group instruction is used to add a second user to the inter-enterprise group. The second join-group instruction may be a join-group instruction sent by a terminal of the second user for the inter-enterprise group, or may be a join-group recommendation instruction sent by a terminal of a member of the inter-enterprise group for the second user.

Further, the client may generate a second join-group request including identity information of the second user according to the second join-group instruction. For example, the client may retrieve the identity information of the second user according to the received second join-group instruction, generate the second join-group request according to the retrieved identity information, and send the second join-group request to the server.

In this case, if determining that the second user is neither an employee of a trusted enterprise nor an employee of the current enterprise, the server may reject the second user from joining the inter-enterprise group. If determining that the second user is an employee of a trusted enterprise instead of an employee of the current enterprise, the server may add the second user to the inter-enterprise group, and send a third notification message to the client, to notify the client that the second user has joined the inter-enterprise group. Correspondingly, after receiving the third notification message sent by the server, the client may display an identity information label of the second user and an inter-enterprise group permission label of the second user in the inter-enterprise group according to the third notification message, to prompt that the second user is prohibited from accessing the data of the inside group stored in the inter-enterprise group.

Step 607: If the first user that is an employee of an outside enterprise has left the inter-enterprise group, delete identity information of the first user in the inter-enterprise group, and replace the inter-enterprise group label of the inter-enterprise group with the inside group label.

When the client is a client of a member of the inside group, if in this case, all employees of outside enterprises in the inter-enterprise group have left, the client of the member of the inside group may display the inter-enterprise group as an inside group, and delete identity information of the employees of the outside enterprises that have left. When the client is a client of an employee of an outside enterprise, if in this case, the employee of the outside enterprise has left the inter-enterprise group, the inter-enterprise group may be directly deleted.

An embodiment of the present invention further provides an IM application server, including one or more processors and one or more machine readable media storing instructions. The one or more processors execute the instructions to enable the IM application server performs the method for establishing an enterprise group on a server side.

An embodiment of the present invention further provides a non-volatile readable storage medium, where instructions in the non-volatile storage medium are executed by a processor in an IM application server to enable the IM application server to perform the method for establishing an enterprise group on a server side.

It is determined, according to a join-group request for adding a first user to an inside group, whether identity information of the first user matches attribute information of the inside group. If the identity information of the first user matches the attribute information of the inside group, the first user is added to the inside group. If the identity information of the first user does not match the attribute information of the inside group, an inter-enterprise group including the first user and all members of the inside group is created. The apparatus for establishing an enterprise group on a server side can automatically identify an identity of an added user and automatically create an inter-enterprise group, thereby effectively simplifying operations of adding a large number of employees of outside enterprises. In addition, an inter-enterprise group label is added to the created inter-enterprise group, an inter-enterprise employee join broadcast is released, and corresponding identity information labels are added to all members in the inter-enterprise group, so that an employee of a current enterprise can be effectively prevented from leaking company data unwittingly.

An embodiment of the present invention further provides an IM application client, including one or more processors and one or more machine readable media storing instructions. The one or more processors execute the instructions to enable the IM application client to perform the method for establishing an enterprise group on a client side.

An embodiment of the present invention further provides a non-volatile readable storage medium, where instructions in the non-volatile storage medium are executed by a processor in an IM application client to enable the IM application client to perform the method for establishing an enterprise group on a client side.

Figure 7:
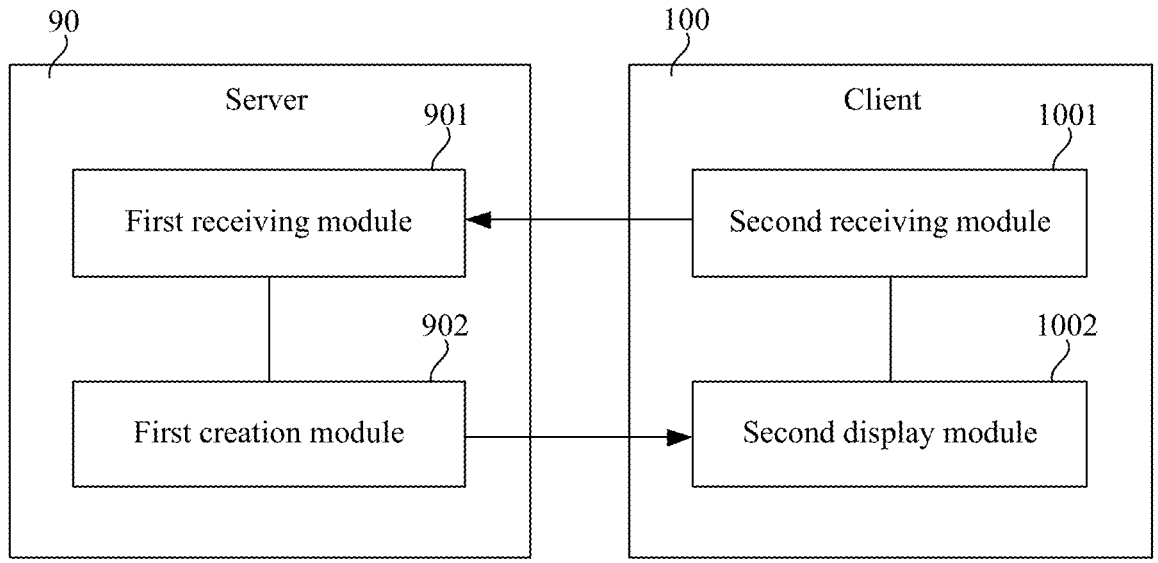
FIG. 7 is a structural diagram of a system for establishing an enterprise group according to an embodiment of the present invention.

Referring to FIG. 7, an embodiment of the present invention further provides a system for establishing an enterprise group, including an apparatus 90 for establishing an enterprise group on a server side and an apparatus 100 for establishing an enterprise group on a client side. The apparatus 90 for establishing an enterprise group on a server side may include a first receiving module 901 and a first creation module 902. The apparatus 100 for establishing an enterprise group on a client side may include a second receiving module 1001 and a second display module 1002.

The second receiving module 1001 may generate a first join-group request including identity information of a first user according to a first join-group instruction for adding the first user to the inside group, and send the first join-group request to the first receiving module 901 of the apparatus 90 for establishing an enterprise group on a server side.

After receiving the first join-group request, the first receiving module 901 may determine, according to the first join-group request, whether the identity information of the first user matches attribute information of the inside group. If the identity information of the first user matches the attribute information of the inside group, the first user is added to the inside group, and a first notification message is returned to the second display module 1002 of the apparatus 100 for establishing an enterprise group on a client side, so that the second display module 1002 displays the inside group including the first user according to the first notification message. If the identity information of the first user does not match the attribute information of the inside group, the first creation module 902 creates an inter-enterprise group, and return a second notification message to the second display module 1002 of the apparatus 100 for establishing an enterprise group on a client side, so that the second display module 1002 displays the inter-enterprise group including the first user according to the second notification message.

In conclusion, by means of the system for establishing an enterprise group provided in this embodiment of the present invention, it is determined, according to a join-group request sent by a first user, whether identity information of the first user matches attribute information of a current inside group. If the identity information of the first user matches the attribute information of the current inside group, the first user is added to the inside group. If the identity information of the first user does not match the attribute information of the current inside group, an inter-enterprise group including the first user and all users in the inside group is created. An identity of an added user is automatically identified, and an inter-enterprise group is automatically created, thereby resolving the problem that addition operations are complex when a large number of employees of outside enterprises need to be added.

The apparatus embodiments are substantially similar to the method embodiments and therefore are only briefly described, and reference may be made to the description of the parts of the method embodiments for the associated parts.

The algorithms and displays provided herein are not inherently related to any specific computer, virtual system or other apparatuses. Various general-purpose systems may also be used with the teachings herein. According to the above description, the structure required for constructing such systems is obvious. In addition, the present invention is not directed to any specific programming language. It should be understood that the content of the present invention described herein may be carried out by using various programming languages, and that the above description for a specific language is for the sake of disclosing optimal embodiments of the present invention.

Numerous specific details are described in the specification provided herein. However, it can be understood that the embodiments of the present invention may be practiced without these specific details. In some examples, well-known methods, structures, and technologies have not been described in detail so as not to obscure this specification.

Those skilled in the art may understand that the modules in devices in the embodiments may be adaptively changed and arranged in one or more devices different from those in the embodiments. The modules or units or components in the embodiments may be combined into one module or unit or component, and in addition, they may also be divided into a plurality of submodules or subunits or subcomponents. At least some of the characteristics and/or processes or units are mutually excluded, all the characteristics disclosed in this specification (including the appended Claims, Abstract, and Drawings) and all the processes or units of any method or device disclosed herein may be freely combined. Unless noted clearly otherwise, each characteristic disclosed in this specification (including the appended Claims, Abstract, and Drawings) may be replaced with an alternative characteristic providing the same, equivalent or similar purposes.

Various component embodiments of the present invention may be implemented by hardware or by software modules running on one or more processors, or implemented by their combination. Those skilled in the art should understand that in practice, a microprocessor or a digital signal processor (DSP) may be used to implement some or all functions of some or all components of the apparatus for establishing an enterprise group according to the embodiments of the present invention. The present invention may also be implemented as a device or an apparatus program (for example, a computer program and a computer program product) for implementing a part or all of the method described herein. Such a program for implementing the present invention may be stored on a computer readable medium, or may have a form of one or more signals. Such signals may be downloaded from an Internet website, or provided on a carrier signal, or provided in any other form.

Figure 8:
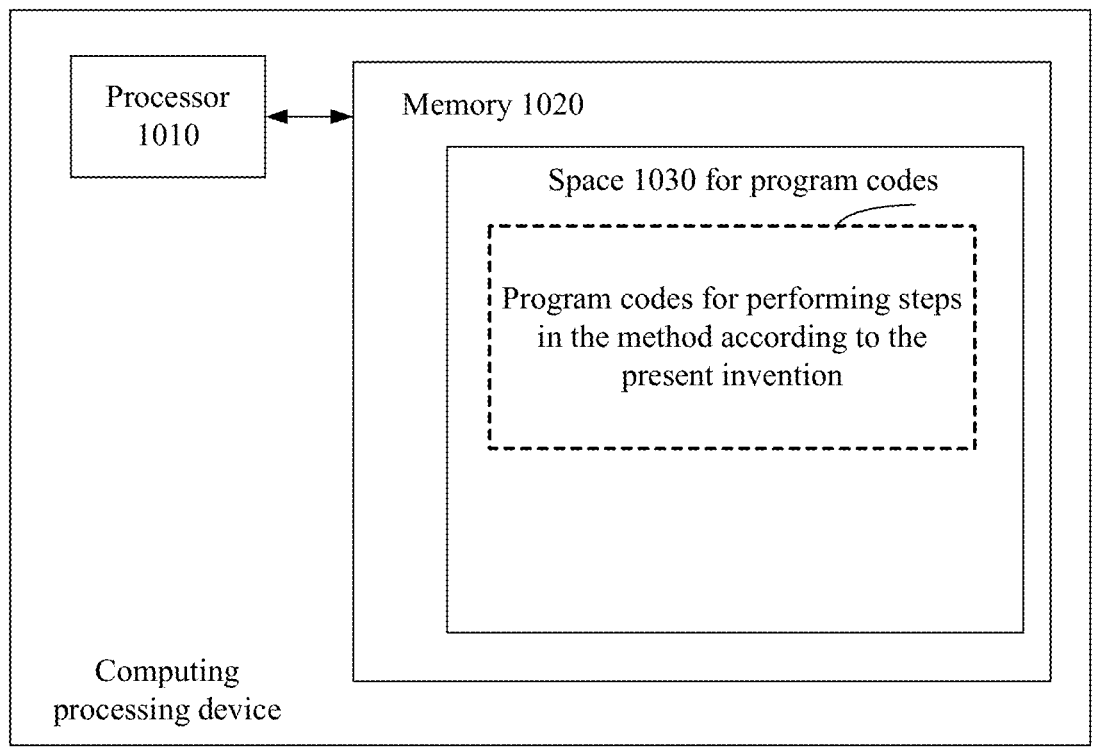
FIG. 8 is a schematic block diagram of a computing processing device configured to perform the method according to the present invention.
Figure 9:
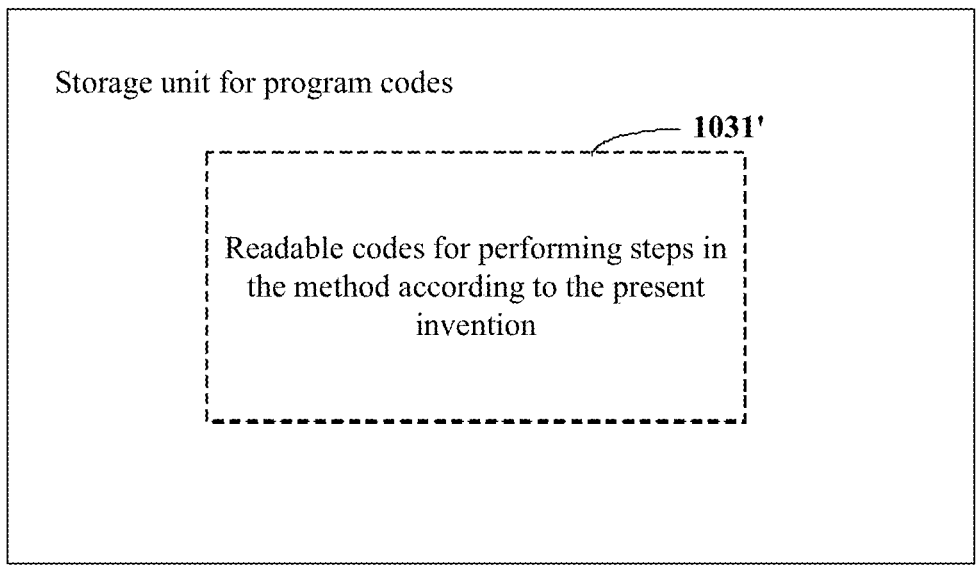
FIG. 9 schematically shows a storage unit configured to store or carry program codes for implementing the method according to the present invention.

For example, FIG. 8 shows a computing processing device that can implement the method for establishing an enterprise group according to the present invention. The computing processing device is, for example, the foregoing server or client. The computing processing device conventionally includes a processor 1010 and a computer program product or a machine readable medium in the form of a memory 1020. The memory 1020 may be an electronic memory such as a flash memory, an electrically erasable programmable read-only memory (EEPROM), an erasable programmable read-only memory (EPROM), a hard disk, and a read-only memory (ROM). The memory 1020 has a storage space 1030 for program codes (instructions) 1031 for performing any method step in the foregoing method. For example, the storage space 1030 for program codes may include various program codes 1031 for implementing various steps in the foregoing method separately. These program codes may be read from one or more computer program products or written into the one or more computer program products. These computer program products include a program code medium such as a hard disk, a compact disc, a memory card or a floppy disk. Such a computer program product is usually a portable or fixed storage unit as shown in FIG. 9. The storage unit may have storage segments, storage spaces, and the like arranged similarly to the memory 1020 in the computing processing device in FIG. 8. Generally, the storage unit includes computer readable codes 1031', that is, codes that can be read by a processor such as the processor 1010. When these codes are run by the computing processing device, the computing processing device performs the steps in the method described above.

It should be noted that the embodiments above are intended to describe the present invention rather than to limit the present invention. Moreover, without departing from the scope of the appended claims, those skilled in the art may design alternative embodiments. In the claims, no reference numerals included within parentheses should constitute a limitation to the claims. The word "comprise" does not exclude elements or steps not stated in the claims. Wording like "a" or "an" before an element does not exclude the existence of a plurality of such elements. The present invention may be implemented by hardware including a plurality of different elements and an appropriately programmed computer. In a unit claim listing several apparatuses, several of such apparatuses may be embodied through the same hardware item. Use of words such as first, second, and third does not indicate any sequence. These words may be explained as names.

The above descriptions are merely specific embodiments of the present invention, but not intended to limit the scope of the present invention. Any variations or replacement that can be easily derived by those skilled in the art should fall within the scope of the present invention. Therefore, the protection scope of the present invention is subject to the appended claims.

What is claimed is:

1. A method for establishing an enterprise group, comprising:
   receiving, by a server, a first join-group request for adding a first user to an inside group, wherein the first join-group request comprises identity information of the first user;
   in response to the identity information of the first user not matching attribute information of the inside group, creating, by the server, an inter-enterprise group according to identity information of at least one member of the inside group and the identity information of the first user; and
   in response to the first user having left the inter-enterprise group, deleting, by a client, the identity information of the first user in the inter-enterprise group, and replacing an inter-enterprise group label of the inter-enterprise group with an inside group label.

2. The method according to claim 1, wherein the creating an inter-enterprise group according to identity information of at least one member of the inside group and the identity information of the first user comprises:
   retrieving, by the server, the identity information of the at least one member of the inside group;
   retrieving, by the server, the identity information of the first user;
   retrieving, by the server, data of the inside group; and
   creating, by the server, the inter-enterprise group according to the retrieved identity information and the data of the inside group.

3. The method according to claim 2, further comprising:
   adding, by the server, an inter-enterprise group permission to the first user in the inter-enterprise group, to prohibit the first user from accessing the data of the inside group stored in the inter-enterprise group.

4. The method according to claim 1, further comprising:
   adding, by the server, a new inter-enterprise group label to the inter-enterprise group.

5. The method according to claim 1, further comprising:
   adding, by the server, a corresponding identity information label to the at least one member of the inter-enterprise group.

6. The method according to claim 1, further comprising:
   receiving, by the server, a second join-group request for adding a second user to the inter-enterprise group;
   in response to identity information of the second user not matching the attribute information of the inside group, adding, by the server, a corresponding identity information label to the second user, and adding an inter-enterprise group permission to the second user to prohibit the second user from accessing the data of the inside group stored in the inter-enterprise group; and
   adding, by the server, the second user to the inter-enterprise group.

7. The method according to claim 6, further comprising:
   in response to the second user having left the inter-enterprise group, deleting, by the server, the identity information of the second user in the inter-enterprise group, and replacing the inter-enterprise group label of the inter-enterprise group with the inside group label.

8. A method for establishing an enterprise group, comprising:
   receiving, by a client, a first join-group instruction for adding a first user to an inside group;
   generating, by the client, a first join-group request comprising identity information of the first user according to the first join-group instruction;
   sending, by the client, the first join-group request to a server, so that, in response to the identity information of the first user not matching attribute information of the inside group, the server creates an inter-enterprise group for the first user and at least one member of the inside group; and
   in response to the first user having left the inter-enterprise group, deleting, by the client, the identity information of the first user in the inter-enterprise group, and replacing an inter-enterprise group label of the inter-enterprise group with an inside group label.

9. The method according to claim 8, further comprising:
displaying, by the client, an inter-enterprise group permission label of the first user, to prompt that the first user is prohibited from accessing data of the inside group stored in the inter-enterprise group.

10. The method according to claim 8, further comprising:
displaying, by the client, the inter-enterprise group label of the inter-enterprise group.

11. The method according to claim 8, further comprising:
displaying, by the client, an identity information label corresponding to the at least one member of the inter-enterprise group.

12. A server, comprising:
one or more processors; and
one or more machine readable media storing instructions, wherein
the one or more processors execute the instructions to enable the server to perform the following operations, comprising:
receiving, by a server, a first join-group request for adding a first user to an inside group, wherein the first join-group request comprises identity information of the first user;
in response to the identity information of the first user not matching attribute information of the inside group, creating, by the server, an inter-enterprise group according to identity information of at least one member of the inside group and the identity information of the first user; and
in response to the first user having left the inter-enterprise group, deleting, by a client, the identity information of the first user in the inter-enterprise group, and replacing an inter-enterprise group label of the inter-enterprise group with an inside group label.

13. The server according to claim 12, wherein the creating an inter-enterprise group according to identity information of at least one member of the inside group and the identity information of the first user comprises:
retrieving, by the server, the identity information of the at least one member of the inside group;
retrieving, by the server, the identity information of the first user;
retrieving, by the server, data of the inside group; and
creating, by the server, the inter-enterprise group according to the retrieved identity information and the data of the inside group.

14. The server according to claim 13, further comprising:
adding, by the server, an inter-enterprise group permission to the first user in the inter-enterprise group, to prohibit the first user from accessing the data of the inside group stored in the inter-enterprise group.

15. The server according to claim 12, further comprising:
adding, by the server, a new inter-enterprise group label to the inter-enterprise group.

16. The server according to claim 12, further comprising:
adding, by the server, a corresponding identity information label to the at least one member of the inter-enterprise group.

17. A non-volatile readable storage medium, wherein when instructions in the non-volatile storage medium are executed by a processor in a server, the processor can perform a method for establishing an enterprise group according to claim 1.

18. A client, comprising:
one or more processors; and
one or more machine readable media storing instructions, wherein when the one or more processors execute the instructions, the one or more processors can perform the method for establishing an enterprise group according to claim 8.

19. A non-transitory storage medium, wherein instructions in the non-transitory storage medium are executed by a processor in a client to enable the client to perform a method for establishing an enterprise group according to claim 8.

* * * * *